United States Patent [19]

Villa

[11] Patent Number: 4,850,314
[45] Date of Patent: Jul. 25, 1989

[54] FLAPPING-PREVENTING RUNNER FOR A PRE-TIMED DISTRIBUTION ASSEMBLY FOR INTERNAL COMBUSTION ENGINES

[75] Inventor: Ercole Villa, Merate, Italy

[73] Assignee: Societa Italiana Catene Calibrate Regina S.p.A., Milan, Italy

[21] Appl. No.: 157,611

[22] Filed: Feb. 19, 1988

[30] Foreign Application Priority Data

Feb. 23, 1987 [IT] Italy .................. 19455 A/87

[51] Int. Cl.$^4$ .................. F01L 31/08; F16H 7/18
[52] U.S. Cl. .................. 123/90.31; 474/140; 474/146
[58] Field of Search ............... 123/90.15, 90.17, 90.31; 474/140, 144, 146, 147

[56] References Cited

U.S. PATENT DOCUMENTS

| | | | |
|---|---|---|---|
| 1,762,034 | 6/1930 | Silberberger | 474/140 |
| 3,885,471 | 5/1975 | Morine et al. | 474/144 |
| 4,425,105 | 1/1984 | Edl et al. | 474/140 |
| 4,642,073 | 2/1987 | Restelli | 474/111 |

FOREIGN PATENT DOCUMENTS

| | | |
|---|---|---|
| 635659 | 7/1963 | Belgium . |
| 2414747 | 8/1979 | France . |
| 2594514 | 10/1987 | France . |
| 2092705 | 8/1982 | United Kingdom . |

Primary Examiner—Willis R. Wolfe
Attorney, Agent, or Firm—Foley & Lardner, Schwartz, Jeffery, Schwaab, Mack, Blumenthal & Evans

[57] ABSTRACT

The flapping-preventing runner (10) constituting the subject-matter of the present invention is constituted by two half-runners (11) and (12), each comprising a couple of divergent guides (14) designed for supporting and guiding the two branches of a transmission chain (21). The two half-runners (11) and (12) are housed inside the dead space existing between the sprocket wheels (19) and (20) and the transmission chain (21) which connects them. In an alternative form of practical embodiment of the invention, the guides (14) are provided with flanges (28) which totally enclose the two transmission chain branches (21).

10 Claims, 3 Drawing Sheets

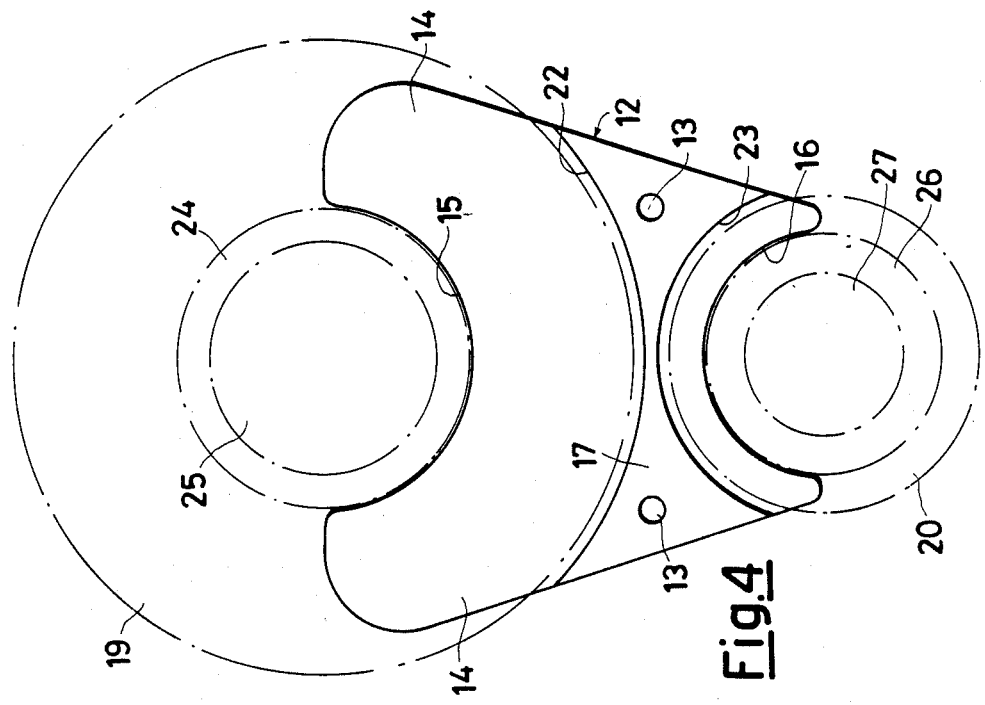
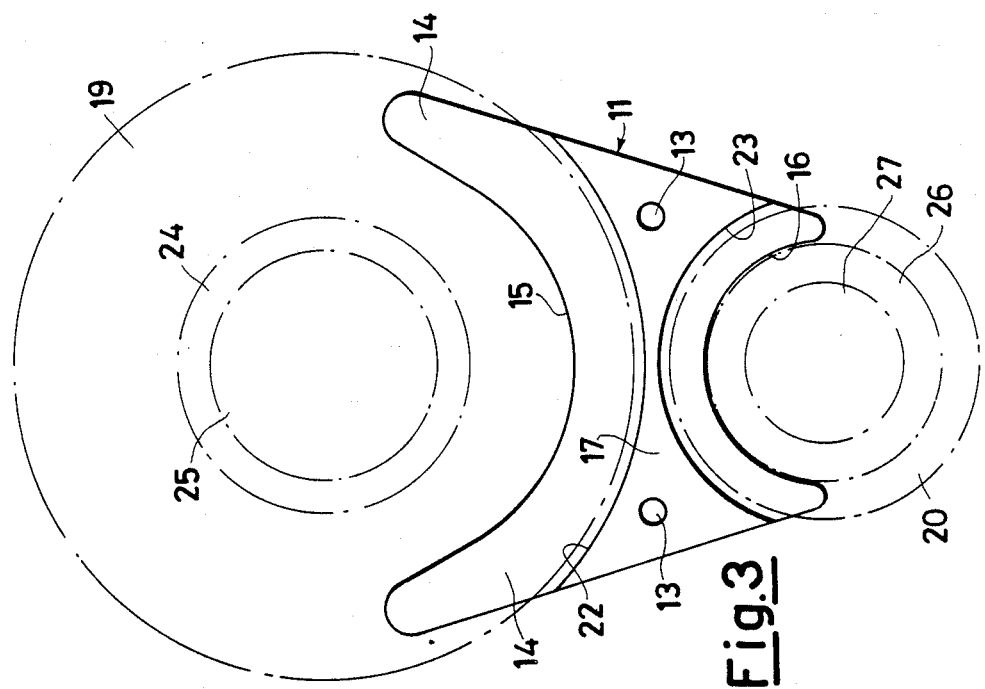

Fig.5
Fig.6
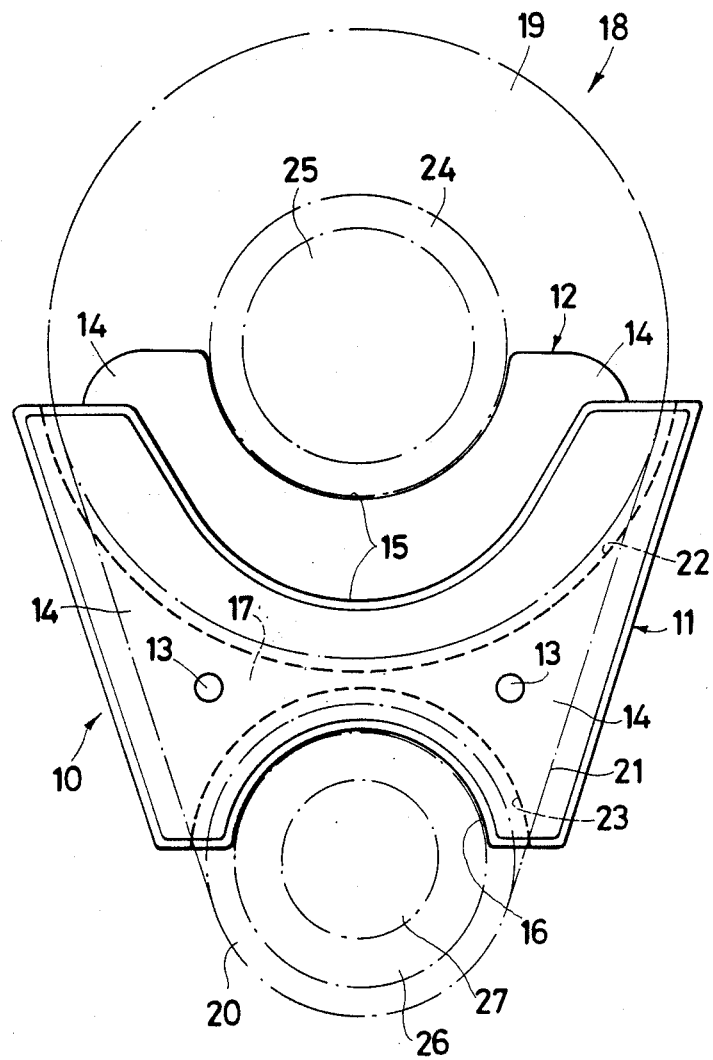
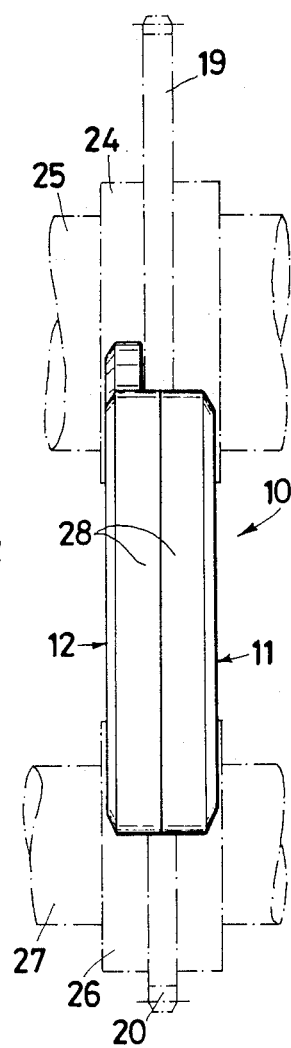

FLAPPING-PREVENTING RUNNER FOR A PRE-TIMED DISTRIBUTION ASSEMBLY FOR INTERNAL COMBUSTION ENGINES

The present invention relates to a flapping-preventing runner for a pre-timed distribution assembly for internal combustion engines.

The distribution assemblies of internal combustion engines are substantially constituted by a couple of sprocket wheels connected in phase by a transmission chain, of single-link or multiple-link type, according to the size of the engine.

Such transmission chains, after a certain number of operation hours, become longer, and start initiating flapping phenomena.

Such phenomena are undesirable, because they are the source of noise, and of further wear.

From the prior art, a chain tightener runner, for tightening the transmission chain of such distribution assemblies is known, such as that disclosed in U.S. Pat. No. 4,642,073 in the same Applicant's name, which, summarizing, is constituted by a hub, from which a couple of guides branch off, which are destined to contain the two branches of the transmission chain of the distribution. Said runner, although achieves the purposes it aims at, suffers from some drawbacks.

The use of said runner does not make it possible a timed pre-assemblage of the distribution assembly to be carried out, and hence it does not simplify the operation of assemblage of the same distribution assembly on the engine.

Furthermore, it is not possible to adopt said runner in a generalized fashion in distribution assemblies destined to any types of engine, as a replacement for pre-existing flapping-preventing devides, performing the same function, but of different conception, due to the lateral overall dimension of th same runner, which is considerably larger than that of the distribution assembly it is associated with.

The purpose of the present invention is to provide a runner for a distribution assembly, having an extremely small lateral overall dimension, and capable of enabling the timed pre-assemblage of the distribution assembly to be carried out.

These and other purposes of the invention are achieved by means of a flapping-preventing runner for the pre-timed distribution assembly of internal combustion engines, constituted by a couple of sprocket wheels connected by a transmission chain, characterized in that it is provided with a first unit and a second unit which are positioned side-to-side to each other, each of them being constituted by a shaped plate with chain-supporting opposite divergent side edges joined by first circumferential locator and centering edges, with at least on the inner face of one of the said half-runners a protruding locator and spacing plane being provided for, which bears means for the mutual linking of the two half-runners, and is bounded by second edges opposite to the top ends of the sprocket wheels.

The invention is illustrated for purely exemplifying, and non-limitative purposes, in the figures of the hereto attached drawing tables, wherein:

FIG. 3 shows a sectional view according to path III—III of FIG. 2;

FIG. 4 shows a sectional view according to path IV—IV of FIG. 2;

FIG. 5 shows a front view of the runner accomplished according to a different form of practical embodiment of the invention;

FIG. 6 shows a side view of the runner of FIG. 5.

Figure 1:
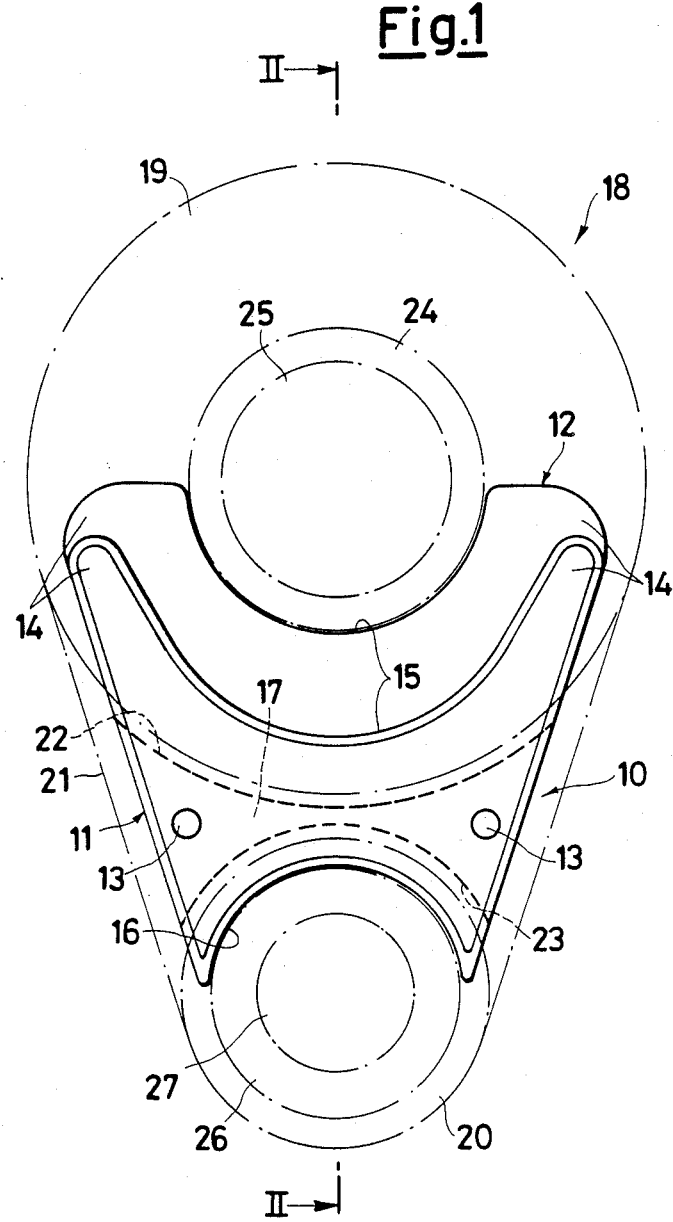
FIG. 1 shows a front view of the runner of the present invention, associated with the relevant transmission assembly, this latter being shown by chain line.
Figure 2:
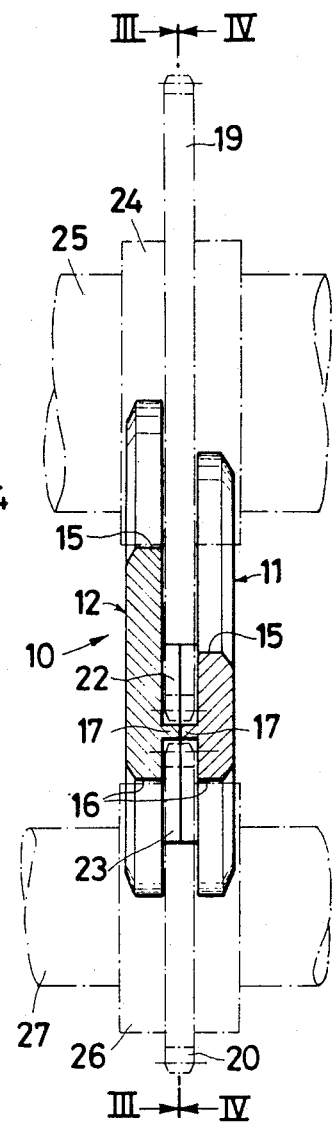
FIG. 2 shows a sectional view according to path II—II of FIG. 1.

Referring to FIGS. from 1 to 4, the runner of the present invention, generally indicated by the reference numeral 10, is associated with a distribution assembly 18, comprising a larger sprocket wheel 19, a smaller sprocket wheel 20 and a transmission chain 21, and is constituted by a first half-runner 11 and a second half-runner 12 (showing a substantially "H"-shaped structure), which can be mutually joined by means of traditional fastening means (not shown in the FIGS.), engaging through-bores 13.

Both said half-runners 11 and 12 comprise a couple of divergent guides 14 joined by a first circumferential edge 15, and a second circumferential edge 16, respectively of larger and smaller diameter. From the inner surfaces of each half-runner 11 and 12, a locator and spacer half-plane 17 protrudes.

The thickness of each half-plane 17 equals half thickness of the sprocket wheels 19 and 20 of the distribution assembly the runner 10 is designed to cooperate with, and determines couples of edges 22 and 23, which are substantially respectively concentrical with the edges 15 and 16.

The only difference existing between the first half-runner 11 and the second half-runner 12 is in the extension of the circumferential edge 15, which is considerably larger in the first half-runner, and in the second half-runner shows a substantially identical radius to that of an either stationary or movable sleeve 24, of the shaft 25 of the sprocket wheel 19 it is destined to lay against.

The edges 16 constitute a locator element cooperating with a sleeve 26 associated with the drive shaft 27 of the sprocket wheel 20, or with other, similar, means.

The first half 11 and the second half 12 of the runner 10 are joined on an already timed distribution assembly 18 constituted by the couples of sprocket wheels 19 and 20 and a transmission chain 21.

In such way, the runner 10 constitutes an integral body with the distribution assembly 18 which is traded in an already timed status, and ready for an extremely simplified application to the shafts 25 and 27 of the engine. The stability and functionality of the runner 10 are secured, first of all, by the presence of the guides 14, which are extended in order to support and guide the transmission chain 21 up to the first points of contact the same has with the sprocket wheels 19 and 20, and, secondly, by the contacts the edge 15 of the second half-runner 12, and the edges 16 of both half-runners 11 and 12 establish with the sleeves 24 and 26 of the distribution shaft 25 and drive shaft 27.

In order to assemble the distribution assembly 18, the first step consists in positioning the sprocket wheels 19 and 20, timed relatively to each other, at the ends of the transmission chain 21.

Then, the first half-runner 11 and the second half-runner 12 of the runner 10 are placed between the sprocket wheels 19 and 20 and are jointed to each other, so that the two branches of the transmission chain come to lay on the guides 14.

At the end of such assemblage operation, the distribution assembly 18 constitutes an integral body, because the guides 14 resting against the transmission chain 21 on one side, and the edges 22 and 23 opposite to the sprocket wheels 19 and 20 on the other, prevent, while respecting the necessary clearances for the assembly to correctly operate, the sprocket wheels 19 and 20 from taking a different timing to that as provided for at the time of assemblage of the whole distribution assembly.

The so-preassembled assembly makes extremely easier the operation of assemblage thereof on the engine it is destined to.

It is evident that the characteristic of the invention, of showing side dimensions which are substantially identical to those of the elements 19, 20 and 21, make its application particularly suitable also for those engines wherein the reduction of the overall dimensions is a more and more stringent requirement.

However, when such a requirement is not so stringent, providing for an alternative form of practical embodiment is possible (see FIGS. 5 and 6), wherein the guides 14 surround, by means of flanges 28, the two branches of the transmission chain 21 running between the sprocket wheels 19 and 20.

I claim:

1. Flapping-preventing runner for the pre-timed distribution assembly of internal combustion engines having at least two sprocket wheels connected by a transmission chain, comprising:
   a first and a second half-runner positioned side-to-side to each other, each said half-runner comprising a shaped plate with chain-supporting opposite divergent guides joined by first circumferential locator and centering edges, a protruding locator and spacing plane located at least on the inner face of one of the said half-runners or a protruding locator and spacing plane being, which bears means for the mutual joining of the two half-runners and, and is bounded by second edges concentric with the outer circumference of the sprocket wheels.

2. Runner according to claim 1, characterized in that it is housed between said sprocket wheels, and wherein said runner has a thickness substantially equalling that of the distribution assembly.

3. Runner according to claim 1, characterized in that the divergent guides are provided with flanges surrounding two branches of the transmission chain.

4. A pre-timed distribution assembly for internal combustion engines, comprising:
   at least two sprocket wheels having parallel axes of rotation;
   a transmission chain disposed about said sprocket wheels;
   first and second plate-shaped members disposed between the axes of rotation of said sprocket wheels;
   said first and second plate-shaped members being substantially parallel to each other and substantially perpendicular to the axes of rotation of said sprocket wheels;
   said first and second plate-shaped members each having opposite chain-supporting guide means joined by circumferential edge portions;
   a means for spacing and positioning disposed between said first and second plate-shaped members;
   said means for spacing and positioning having opposite edges concentric with said sprocket wheels.

5. A flapping-preventing runner for a pre-timed distribution assembly for internal combustion engines having at least two sprocket wheels with parallel axes of rotation and a transmission chain disposed about said sprocket wheels, said runner comprising:
   a first and second plate-shaped members disposed between the axes of rotation of said sprocket wheels;
   said first and second plate-shaped members being substantially parallel to each other and substantially perpendicular to the axes of rotation of said sprocket wheels;
   said first and second plate-shaped members each having opposite chain-supporting guide means joined by circumferential edge portions;
   said circumferential edge portions being concentric with said sprocket wheels.

6. The flapping-preventing runner for pre-timed distribution units according to claim 5, wherein said first and second plate-shaped members are integral with each other.

7. The flapping-preventing runner for pre-timed distribution units accordign to claim 5, wherein the radii of said circumferential edge portions are less than the radius of an outer circumferential surface of the corresponding sprocket wheel.

8. The flapping-preventing runner for pre-timed distribution units according to claim 5, further comprising a means for spacing and positioning disposed between said first and second plate-shaped members, said means for spacing and positioning having opposite edges concentric with said sprocket wheels.

9. The flapping-preventing runner for pre-timed distribution units according to claim 7, further comprising first and second sleeve members each concentric with a corresponding sprocket wheel and each having a radius less than corresponding circumferential edge portions.

10. The flapping-preventing runner for pre-timed distribution units according to claim 8, wherein said plate-shaped members and said means for spacing and positioning form an integral structure.

* * * * *